United States Patent [19]

Auslander

[11] Patent Number: 5,290,348
[45] Date of Patent: Mar. 1, 1994

[54] NON AQUEOUS FLUORESCENT DISPERSION INK WITH IMPROVED SHELF LIFE, TACK AND FLOW

[75] Inventor: Judith D. Auslander, Westport, Conn.

[73] Assignee: Pitney Bowes Inc., Stamford, Conn.

[21] Appl. No.: 956,202

[22] Filed: Oct. 5, 1992

[51] Int. Cl.$^5$ ............................................. C09D 11/08
[52] U.S. Cl. .................. 106/23 R; 106/20 R; 106/21 R; 106/27 R; 106/28 R; 106/30 R
[58] Field of Search ............... 106/21 R, 20 R, 23 R, 106/27 R, 28 R, 30 R

[56] References Cited

U.S. PATENT DOCUMENTS

| | | | |
|---|---|---|---|
| 2,970,965 | 2/1961 | Switzer | 252/301.2 |
| 3,928,226 | 12/1975 | McDonough et al. | 252/301.2 |
| 4,361,843 | 11/1982 | Cooke et al. | 106/27 R |
| 4,386,961 | 6/1983 | Lin | 106/27 R |
| 4,400,215 | 8/1983 | Cooke et al. | 106/27 R |
| 4,531,976 | 6/1985 | Lin | 106/27 R |
| 4,767,459 | 8/1988 | Greenwood et al. | 106/22 R |
| 4,793,264 | 12/1988 | Lin et al. | 106/27 R |
| 4,822,418 | 4/1989 | Lin et al. | 106/27 R |
| 5,114,478 | 5/1992 | Auslander et al. | 106/20 R |

*Primary Examiner*—Helene Klemanski
*Attorney, Agent, or Firm*—Peter Vrahotes; Melvin J. Scolnick

[57] ABSTRACT

Fluorescent Ink formulations have been conceived that result in inks having improved tack and flow properties so that problems relating to ink plugging with contemporary ink pads are reduced. Another advantage to the inks is that they have improved paper dust resistance, shelf life and flow properties. These inks are made of a coloring material having an organic non fluorescent pigment dispersed in a rosin ester and a solid solution of a fluorescent dye in triazine paraformaldehyde aryl sulfonamide resin dispersed in an alkyd resin. The solvent system is preferably composed of non drying solvents such as emollients and higher molecular weight glycols.

22 Claims, No Drawings

NON AQUEOUS FLUORESCENT DISPERSION INK WITH IMPROVED SHELF LIFE, TACK AND FLOW

BACKGROUND OF THE INVENTION

Many advances have been made recently in the field of printing. Great demands have been made upon printing systems and materials therefor in light of the need of faster printing, in conjunction with the computer age, and the seeking of lower toxicity to comply with governmental environmental regulations. In high speed printing, a problem has been encountered with paper dust which is generated during paper transport and the impact of a printing element on the paper. This is particularly true of printing on envelopes which are made of paper with loose fibers.

One of the components of the printing system that has required extensive modification is the ink. In most printing applications, a pad or roller made of a porous material is supplied with ink for the purpose of transferring the ink to a printhead. The printing pad may be one which is self contained or one that is periodically supplied with ink from a reservoir.

Problems in producing a satisfactory ink are compounded when one seeks to produce an ink that results in printing wherein the printed matter can be seen visually in ordinary light and can be seen having the same or a different color when exposed to ultraviolet light. These inks are known as fluorescent inks and are useful because of their ability to be detected by an optical device. Such inks have wide spread use in the mail handling field where devices, referred to as postage meters or franking machines, print an indicia upon mail pieces. The fluorescent ink yield the ability to determine the location of an indicia on a mail piece and discern the authenticity of postage.

The problems in producing a satisfactory fluorescent ink are compounded because a plurality of dyes and pigments are required for achieving good color, fill in, edge acuity and the other qualities required from an ink. One of the major problems associated with inks is aging which results in printing that has a change in color and intensity with the passing of the time the ink is stored. An ink that overcomes the aging problem and shows low environmental sensitivity at high humidity and low and high temperature, low tackiness and flow properties, material compatibility and paper dust resistance would be advantageous. Another consideration is that the ink pad must function in an open environment without drying for at least six months; therefore, the ink solvents should be non volatile.

SUMMARY OF THE INVENTION

Non aqueous, fluorescent dispersion ink formulations have been discovered that are nontoxic and have flow properties which substantially reduce the tendency of the ink to cause plugging in an inking pad. Ink pad life has a variability caused mainly by the inherent properties of the ink with which it is used. The inking pad may be assembled with two layers of foam, the first layer serving as an ink reservoir layer and the second layer serving as a metering layer which contacts the print head. Because of its high density and smaller pore size, the metering layer can act as a filter as a consequence of the ink concentrating at the interface of the two layers. As a result, plugging tends to occur. Of course, what is meant by plugging is the fact that particles of the ink are captured within the pores of the inking member which prevent the flow of ink.

It has been found that the plugging onset can be delayed with the ink formulations of the instant invention because of decreased dissolved resin concentration, thereby decreasing the viscosity, even though the size of the pigments can vary from $0.1\mu$ to $5.0\mu$. Plugging onset also is delayed through stabilization of the pigment dispersion by the macromolecules present in the alkyds of the fluorescent pigments and in the rosin esters used in the predispersed, non fluorescent pigments.

The ink formulation of the instant invention is based on combinations of organic non fluorescent pigments dispersed in a rosin ester and a solid solution of fluorescent dyes in amino formaldehyde resin dispersed in an alkyd resin. The resulting visual color of these inks can be red, blue, green or black. It has been found that these ink formulations reduce the effects of paper dust accumulations because the solvents of the instant ink formulations are non drying on the printing elements and maintains printing elements in a wet state. Preferably the solvent has emollient properties. This wet state causes the flushing of elements resulting in paper dust being carried away. Lower concentrations of dissolved resin produces a lower tack ink which results in less paper dust attraction in the ink.

The ink formulations of the instant invention have low environmental sensitivity due to small variation of the viscosity in the operating temperature range of 5° to 45° C. and the low hygroscopicity of the solvents.

The preferred embodiment of the invention is the inclusion of an emollient solvent in the ink formulation. Use of this type of solvent has been found to be compatible with the pigments used to produce the ink, provides low toxicity, ease of fabrication of the ink, is inert to materials in the inking system and provides a non-drying ink. Another advantage to the inclusion of an emollient solvent is that it is non-volatile and consequently results in the inking pad not drying.

DETAILED DESCRIPTION OF THE PREFERRED EMBODIMENT

The formulations of the instant invention provide inks with improved print quality, are inert to materials used in a printer such as inker foams and rubber, have low tack, good shelf life stability, and good flow through porous foam materials.

It has been found that the inks of the instant invention have an acceptable shelf life. The aged samples show no settling after two weeks of accelerated testing. The aging of the inks by temperature shock shows no settling for the inks during two weeks of accelerated testing that simulated one year of aging by varying the temperature between 70° C. to $-20°$ C., every four hours of the working day.

The dual inker foam described above that is used for making the print pad in high speed flat bed systems is made of a polychloroprene foam bottom layer. The top layer is made of polyethylene sintered foam. The rubber used in the print head is made of polybutadiene acrylonitrile rubber, which is plasticized with dibutyl phthalate. The solvents used in the instant ink formulations are inert to all these materials. The print head should be usable for ten million prints, or ten years, and the pad materials should be compatible with the inks for six months and non drying in an open environment.

The non aqueous pigment dispersion used in the ink formulation is stabilized by using easily dispersible non fluorescent organic pigments predispersed in a vehicle such as rosin ester carrier, linseed oil alkyds, or other type of alkyds. The rosin ester dispersants are preferable because of the wide range of compatibility with solvents and resins. The non-fluorescent pigments also can be predispersed in a non-ionic surfactant such as oleyl alcohol ethoxylate and the like.

In one embodiment, the non fluorescent pigments are mixed with red fluorescent pigments in order to obtain red fluorescent inks. The solvent system makes up 40% to 90% of the formulation and is preferably of the emollient solvent type. The solvent system can be composed of 95% to 99% polyoxypropylene stearyl ether (an emollient solvent) and 1% to 5% of other additives such as nonyl phenoxy polyoxyethylene ethanol. All percentages in this disclosure and the accompanying claims are in weight percent. Other solvents that can be used are castor oil, polypropylene (10) cetyl ether, soy bean oil, oleic acid and polypropylene glycol or mixtures of solvents such as 70% stearyl polyoxypropylene ether and 30% polypropylene glycol. The pigment dispersion can be further stabilized with 0.2% to 1% of a coupling agent such as neoalkoxy titanite and 1% to 5% emulsifiers such as nonyl phenoxy polyethoxylated alcohols, which emulsifiers have an HLB (hydrophylic lipophylic balance) value from 2 to 16. The inks of the formulation may have visual red and non red color of acceptable purity, such as blue, black and green and red fluorescence that yields a high signal. The solvent system is inert to the materials used in the printer, such as inker foams, print elements, pumps, tubing, print pads, and the like.

The formulation of the instant invention involves unique color combinations based on mixtures of pigments such as the phthalocyanines and red fluorescent organic pigments and results in strong non red colors with high purity and a red fluorescent portion with high fluorescent signal.

The selection of the phthalocyanines is based also on their dichroic properties. They reflect highly in the red region of the spectrum where the transmitted color is much greener.

Non fluorescent organic pigments such as phthalocyanines are used in different forms such as powder or chips or predispersed pigments in rosin esters, pigments flushed with added rosin ester and soy bean oil or pigments flushed with non-ionic surfactants such as oleyl alcohol ethoxylates, the non-ionic surfactants representing 6 to 10% of the formulation.

The organic fluorescent pigments are solid solutions of fluorescent dyes in friable organic resins of the aminoaldehyde type. For example, organic resins such as triazine para formaldehyde and aryl sulfanomide which are dispersed in drying type alkyd vehicles, such as linseed oil alkyd and alkyd varnish manufactured and available from Lawter Company.

The average particle size of the pigments, non fluorescent and fluorescent, is between 0.1 and 0.5µ for at least 98% of the non fluorescent and between 0.1 to 0.5µ for at least 98% of the fluorescent pigments. Because of the larger size of the pigments, the collision probability followed by quenching is less probable than in a molecular solution. This results in the ability to achieve blue visual color with red fluorescence.

Dispersed pigments can be diluted with a mixture of solvents composed of: polyoxypropylene stearyl ether 15-60%, low molecular weight polypropylene glycol, 5 to 30%, polyoxyethylene oleyl ether 5 to 20%, and optionally emulsifiers such as nonyl phenoxypolyoxy ethylene alcohol with a hydrophilic lipophilic balance (HLB) from 4 to 13, 1 to 5%, and optionally a coupling agent for the dispersion stabilization such as titanate polyalkoxy complex (neopentyl diallyl) oxy, tri (dioctyl) pyro-phosphatotitanite, 0.3 to 0.5%.

Another component that may be included as an additive to the ink formulations is fumed silica with grafted polysiloxane groups. This additive controls the thixotropy of the ink, reduces surface tension and flattens the variation of the viscosity at different temperatures. At the same time, it reduces the hygroscopicity of the ink.

The present invention provides a new class of inks that are compatible with the inert to the polymeric materials used in contemporary printers. Examples of such inks are as follows:

| General Composition | |
|---|---|
| Ingredients | Weight Percent |
| 1. Non fluorescent organic pigments ($\approx$33%) predispersed in a rosin ester vehicle ($\approx$67%) and, optionally pigments, flushed in a non ionic surfactant such as oleylpolyoxy ethylene ether and fatty acid ester C12 to C14: | 1-10% |
| Example of non fluorescent organic pigments are: | |
| a) C.I. Pigment Blue 15.1 and Blue 15.3 | |
| b) RED LAKE C (Pigment Red 53:1) | |
| c) Pigment Red C.I. #144 | |
| d) PERMANENT RED 2B (Pigment Red 48 CI 144) | |
| e) LITHOL RED (Pigment Red 49:1) | |
| f) Pigment Red 52:1 | |
| g) Pigment Yellow C.I. #110 | |
| h) Pigment Brown C.I #23 | |
| i) Pigment Green C.I. #7 | |
| j) Pigment Black C.I. #7 | |
| 2. Fluorescent pigments made of solid solutions of fluorescent dyes ($\approx$20%) in triazine aryl sulfonamide/paraformaldehyde resin dispersed in linseed oil alkyd or in other alkyd varnish ($\approx$80%) | 5.0 to 30% |
| Examples of Fluorescent dyes are: | |
| a) Solvent Red 49 | |
| b) C.I. Basic Red 1 | |
| c) C.I. Basic Violet 11.1 | |
| d) ALBERTA YELLOW | |
| e) POTOMAC YELLOW | |
| 3. Non aqueous continuous phase | 40 to 90% |
| a) Polypropylene glycol | |
| b) Emollient solvent: polyoxypropylene stearyl ether or polyoxypropylene (10) cetyl ether | |
| c) Oleic acid | |
| d) Castor oil | |
| e) Soy bean oil | |
| f) a mixture of 10 to 30% polypropylene glycol and 70 to 90% stearyl polyoxypropylene ether or 70 to 90% polyoxypropylene (10) cetyl ether | |
| 4. Low polarity emulsifier (optional) nonylphenoxypolyoxyethylene ethanol HLB value 2-4.9 | traces to 5% |
| 5. Moderate polarity emulsifier (optional) with HLB value 11-16 | 1.0 to 5.0% |
| 6. Surface tension modifier (optional) a) silicon glycol b) fumed silica with grafted polysiloxane groups | 0.1 to 4.0% |
| 7. Coupling Agent (optional) titanite neoalkoxy | 0.2 to 1% |

| General Composition | |
|---|---|
| Ingredients | Weight Percent |
| 8. Linseed oil alkyd | trace to 10% |

It will be appreciated that the above are given by way of example only and one skilled in the art will recognize that other components having similar properties can be used in the practice of the invention.

| Example I Blue ink - Red Fluorescent | | |
|---|---|---|
| Ingredient | Manufacturer | wt % |
| Emollient Solvent ARLAMOL E (polyoxypropylene stearyl ether) | ICI | 33.6 |
| Polypropylene glycol PLURACOL P-410 | BASF | 30.0 |
| Non-ionic surfactant AMEROXIL (oleylalcoholethoxylate) OE-5 | Amerchol | 7.6 |
| Nonyl phenoxy polyethylene ethanol IGEPAL CO 530 (nonylphenoxy polyoxyethylene oxyethanol) | GAF | 5.0 |
| IGEPAL CO 210 (nonylphenoxypolyoxyethyleneoxyethanol) | GAF | 3.0 |
| Titanite couplying agent LICA 38 (titanite neoalkoxy) | Kenrich | 0.3 |
| Red Fluorescent Pigment LAWTER RED FLUSH C.I. 2 | Lawter Intl. | 17.0 |
| D-536 MICROLITH BLUE TG (C.I. Pigment Blue 15.1) | Ciba Geigy | 3.5 |

Properties

Brookfield viscosity:
2 spindle/12 RPM/spindle guard 575±50 cps after 3 minutes.

The ink was shaken for 5 minutes and allowed to set for one hour prior to viscosity measurement.

Haake rotational viscometer (RV—20) Sensor SV DIN

Viscosity at 0.5 sec—1 after 13 min ≈1200 cps

Viscosity at 500 sec—1 after 10 min 229 cps

Color Hunter lab L 55±5; a—5.3±1.0; b—21.4±1.0

Fluorescence fresh drawdown is 35 pMU

Maximum wave length fluorescent emission when excited at 254 nm is 591 nm

Percentage of volume swell of an ESN 30 rubber print die increase after 28 days at 70° C. is ≈2%

Number of continuous prints from neoprene/polyethylene inker pad is 500K with a drop in PMU of less than 20% (compared to the first print).

Settling test: ASTM D 1309. After 2 weeks rating was 8.

| | Manufacturer | wt % |
|---|---|---|
| Example II | | |
| Pigment Blue in rosin ester Microlith Blue 4 GT | Ciba Geigy | 4.0 |
| Fluorescent pigment D-536 | Lawter Int. | 20 |
| Arlamol E | ICI | 76 |
| Properties | | |
| Fluorescence of drawdown | 35 PMU | |
| Hunter color parameters | L, 49.2 a, 5.1 b. 25.2 | |
| Viscosity at 500 sec$^{-1}$ is 209 cp. | | |

The ASTM D-1309 test for settling shows a rating of 8 (perfect dispersion with no settling).

| Example III Red Ink - Red Fluorescence | | |
|---|---|---|
| Ingredient | Manufacturer | wt % |
| Pigment Red 52.1 (20%) AMEROXOL flushed in OE5 (oleylalcoholethoxylate) (80%) | Penn Color | 2.0 |
| Red Fluorescent Pigment D-536 Solid solution of Basic Red 1 in triazine paraformaldehyde aryl sulfonamide | Lawter Intl. | 18.0 |
| MICROLITH RED BRT (Pigment red C.I. 144 predispersed in rosin ester) | Ciba Geigy | 1.0 |
| MICROLITH BROWN (Pigment Brown C.I. 123) | Ciba Geigy | 0.5 |
| MICROLITH YELLOW (Pigment Yellow C.I. 110) | Ciba Geigy | 0.5 |
| BLAZE ORANGE (pigment consisting of a aminoformaldehyde/sulphonamide resin and Basic violet 11:1, Basic Red 1, Alkyd resin and hydrocarbon oils) | DayGlo | 4.0 |
| Igepal CO - 210 | GAF | 2.0 |
| Igepal CO 530 | GAF | 2.0 |
| LICA 38 (titanium IV neoalkanolato, tris (diisooctyl) pyrophosphate) TITANATE and LICA 09 | Kenrich | 0.6 |
| Emollient Solvent Arlamol E | ICI | 44.4 |
| Polypropylene Glycol Pluracol P-410 | BASF | 24.53 |
| Fumed Silica (CABOSIL TS-720) grafted siloxanes on fumed silica | Cabot chemical | 047 |

| Properties for Example III | |
|---|---|
| Fluoresoence of drawdown | 160 PMU |
| Color, Hunter parameters | L = 61.16 |
| | a = 48.58 |
| | b = 20.89 |
| Viscosity at 15° C. at 500 sec$^{-1}$ | 462 cps |
| Viscosity at 25° C. at 500 sec$^{-1}$ | 258 cps |
| Viscosity at 45° C. at 500 sec$^{-1}$ | 96 cps |
| Average particle size diameter | 0.3μ |
| Shelf life by ASTM procedure D-1309 | Rating 10 |
| Water absorption at 29° C., 95% RH after 23 hrs gr% | 1.07 wt % |
| Yield stress | 1-1.4 Pa |
| Plastic viscosity | .210 cp |
| Number of prints obtained by continuous printing without decrease in print intensity | 500K |

| Example IV Blue Ink - Red Fluorescence | | |
|---|---|---|
| Ingredient | Manufacturer | wt % |
| Red Fluorescent Pigment D536 | Lawter | 16 |
| PHTHALOCYANINE BLUE/OE2 (Pigment Blue 15.1 and Pigment Blue 15.3) | Penn Color | 4 |
| Microlith Blue 4GT | Cibe Geigy | 2 |
| Polypropylene Glycol (Pluracol P410) | BASF | 25 |
| Nonyl phenoxy polyoxyethylene ethanol Igepal CO 210 & CO 530 | | 4 |
| | | 2 |
| LICA 38 TITANATE (titanium IV neoalkanolato, tris (diisooctyl) pyrophosphate) coupling agent | Kenrich | 0.3 |
| Emollient Solvent Arlamol E | ICI | 44 |
| Linseed Oil Alkyd | Lawter | 4.7 |
| | Total | 100.0% |

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. A non aqueous fluorescent dispersion ink composition, comprising:
   a) 40 to 90% by weight of an non aqueous continuous phase of emollient solvent,
   b) 1-10% by weight non fluorescent organic pigment having a size of 0.1 to 0.5 microns dispersed in rosin ester, and
   c) 5-30% by weight organic fluorescent pigment having an average particle size of 0.1 to 0.5 microns made of solid solution of fluorescent dye in triazine toluene sulfonamide/formaldehyde resin dispersed in an alkyd resin varnish of linseed oil alkyd resin.

2. The non aqueous, fluorescent dispersion ink composition of claim 1 wherein said non aqueous continuous phase further includes 0.1 to 4% of a surface tension modifier.

3. The non aqueous fluorescent dispersion ink composition of claim 1 wherein said non aqueous continuous phase further includes 0.1 to 4.0% fumed silica with grafted polysiloxane groups.

4. The non aqueous, fluorescent ink composition of claim 1 wherein said organic non fluorescent pigment is flushed in non-ionic surfactants having an HLB of 4 to 13.

5. The non aqueous, fluorescent ink composition of claim 1 wherein said non aqueous phase includes 1 to 5% by weight nonyl phenoxy polyoxyethylene ethanol.

6. The non aqueous, fluorescent dispersion ink composition of claim 5 wherein said non aqueous phase further includes 5 to 30% by weight polypropylene glycol.

7. The non aqueous, fluorescent dispersion ink of claim 1 wherein said non aqueous phase is selected from the group consisting of polyoxypropylene stearyl ether, polyoxypropylene (10) cetyl ether, oleic acid, castor oil, soy bean oil, a mixture of 10 to 30% by weight polypropylene glycol and 70 to 90% by weight stearyl polyoxypropylene ether, and 10 to 30% polypropylene glycol and 70 to 90% by weight polyoxypropylene (10) cetyl ether.

8. The non aqueous, fluorescent dispersion ink composition of claim 1 wherein said non aqueous continuous phase further includes trace to 10% by weight linseed oil alkyd resin.

9. The non aqueous, fluorescent dispersion ink composition of claim 7 wherein said polyoxypropylene stearyl ether is an emollient solvent.

10. The non aqueous, fluorescent dispersion ink composition of claim 1 further including 0.2 to 1% by weight coupling agent.

11. A non aqueous, fluorescent dispersion ink composition comprising:
    a) 40 to 90% by weight non aqueous solvent containing 95 to 99% by weight emollient, 1 to 5% nonyl phenoxy polyoxyethylene ethanol,
    b) 1 to 10% by weight non fluorescent organic pigment flushed in a non ionic surfactant and,
    c) 5.0 to 30% by weight fluorescent pigment.

12. The non aqueous, fluorescent ink composition of claim 11 further including trace to 5% by weight of a first emulsifier having a hydrophilic lipophilic balance value of 2 to 4.9 and a second emulsifier having a hydrophilic lipophilic balance of 11-16.

13. The non aqueous, fluorescent dispersion ink composition of claim 11 wherein at least 98% of said non fluorescent pigment has a particle size of 0.1 to 0.5 µ and the average particle size for at least 98% of said fluorescent pigment is 0.1 to 0.5 µ.

14. The non aqueous, fluorescent dispersion ink composition of claim 11 wherein said non-fluorescent pigment is selected from the group consisting of dispersed pigment in rosin ester, and pigment flushed in oleyl-polyoxy ethylene ether.

15. A non aqueous, continuous fluorescent dispersion ink composition comprising:
    a) 40-90% by weight a non aqueous phase, and
    b) 10-30% by weight a coloring material including an organic non fluorescent pigment predispersed in a rosin ester and a solid solution of a fluorescent dye in amino formaldehyde resin dispersed in an alkyd resin.

16. The non aqueous, fluorescent dispersion ink of claim 15 wherein at least 98% of said organic non fluorescence pigment has a particle size of 0.1 to 0.5 microns.

17. The non aqueous, fluorescent dispersion ink of claim 15 wherein at least 98% of said of fluorescent dye has a particle size of 0.1 to 0.5 microns.

18. A non aqueous, fluorescent dispersion ink composition comprising:
    a) 40 to 90% by weight of a non aqueous continuous phase selected from the group consisting of castor oil, oleic acid, and soy bean oil, polyoxypropylene stearyl ether, polyoxypropylene (10) cetyl ether, a mixture of 10 to 30% by weight polypropylene glycol and 70 to 90% by weight polyoxypropylene stearyl ether, and 10 to 30% by weight polypropylene glycol and 70 to 90% by weight polyoxypropylene (10) cetyl ether
    b) 5-30% by weight non fluorescent organic pigment having an average particle size of 0.1 to 0.5 microns dispersed in rosin ester, and
    c) 1-10% by weight organic fluorescent pigment having an average particle size of 0.1 to 0.5 microns made of solid solution of fluorescent dye in triazene toluene sulfanomide/formaldehyde resin dispersed in a linseed oil alkyd resin.

19. The non aqueous, fluorescent dispersion ink composition of claim 18 wherein said non aqueous continuous phase further includes 0.1 to 4% by weight of a surface tension modifier.

20. The non aqueous, fluorescent dispersion ink composition of claim 18 wherein said non aqueous continuous phase further includes 0.1 to 4.0% by wight fumed silica with grafted polysiloxane groups.

21. The non aqueous, fluorescent dispersion ink composition of claim 18 wherein said organic fluorescent pigment is flushed in non-ionic surfactants having an HLB of 4 to 13.

22. The non aqueous, fluorescent dispersion ink composition of claim 18 wherein said non aqueous continuous phase includes 1 to 5% by weight nonyl phenoxy polyoxyethylene ethanol.

* * * * *